Patented May 12, 1931

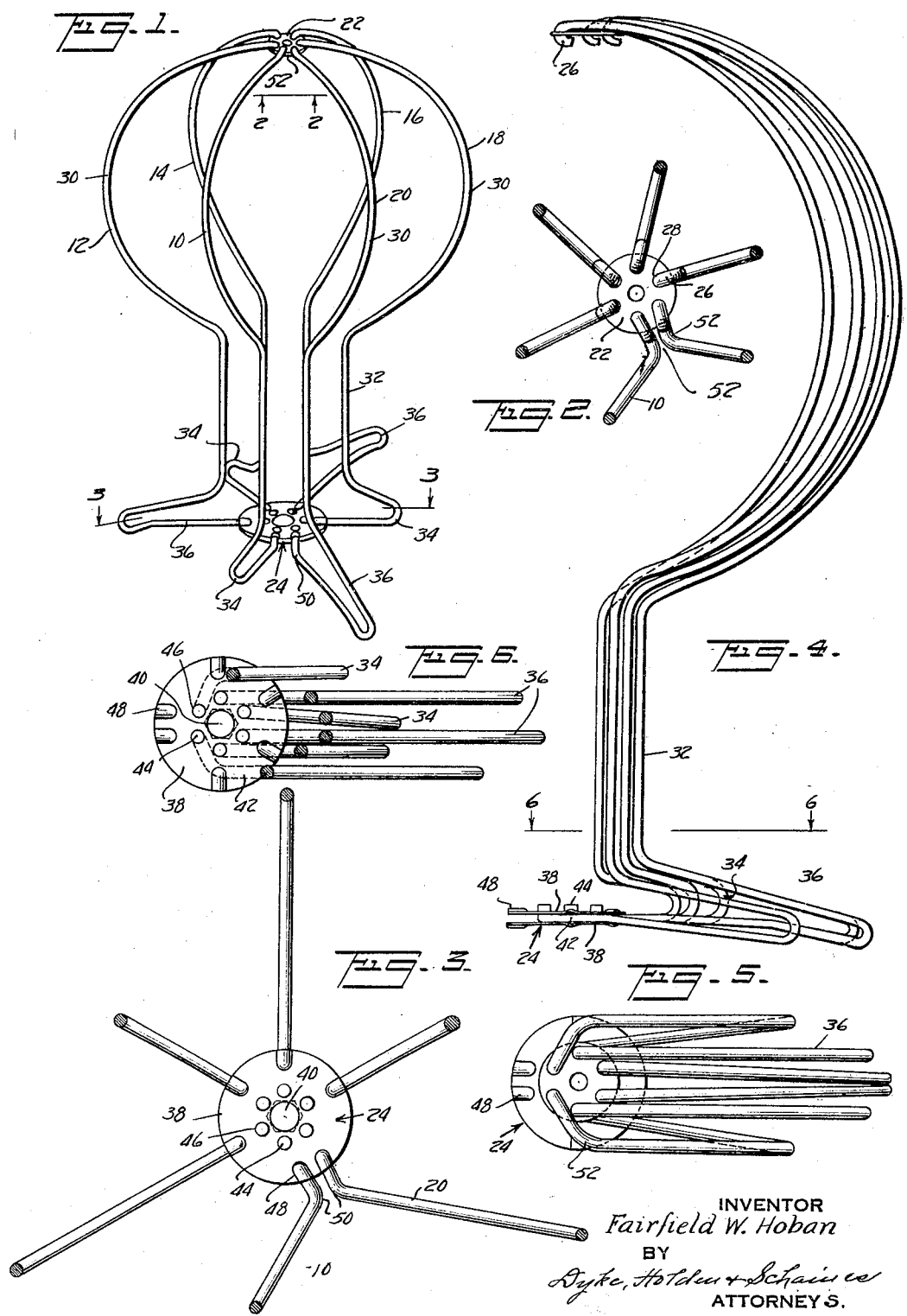

1,804,931

UNITED STATES PATENT OFFICE

FAIRFIELD W. HOBAN, OF NEW YORK, N. Y., ASSIGNOR TO FAIRFIELD SPECIALTIES CORPORATION, OF NEW YORK, N. Y., A CORPORATION OF NEW YORK

SUPPORT FOR HATS AND THE LIKE

Application filed November 1, 1929. Serial No. 403,961.

My invention relates to improvements in means for supporting hats and the like, and the same has for its object to provide a simple, durable and efficient device which is produced at low cost and which is convenient in use.

Another object of the invention is to provide a device of the character specified which is foldable or collapsible into compact form to permit of the same being conveniently carried in traveling bags or the like or to be otherwise placed out of the way, and which is readily expanded or extended to provide an enlarged support for the hat or the like.

Another object of the invention is to provide a device of the character specified in which the members thereof are locked in expanded or unfolded position.

Another object of the invention is to provide a device of the character specified in which the foldable members thereof in part provide means for supporting the hat or the like and in part means for supporting the device as a whole upon a suitable surface.

Other objects will in part be obvious and in part be pointed out hereinafter.

In the accompanying drawings:

Figure 1 is a perspective of one form of device constructed according to and embodying my said invention, the same being shown in extended or operative position;

Fig. 2 is a section thereof on the line 2—2 of Fig. 1, looking in the direction of the arrows;

Fig. 3 is a section thereof on the line 3—3 of Fig. 1, looking in the direction of the arrows;

Fig. 4 is an elevation thereof showing the same in collapsed or folded condition;

Fig. 5 is a plan of the device as shown at Fig. 4; and

Fig. 6 is a section thereof on the line 6—6 of Fig. 4, looking in the direction of the arrows.

Referring to the drawing, the device consists of three or more, preferably six members 10, 12, 14, 16, 18 and 20, disposed in vertical radial planes, and pivotally connected at the ends thereof to the upper and lower connectors or portions 22 and 24. The members 10—20 are preferably composed of relatively stiff wire formed or shaped as hereinafter described. The pivotal connections are made to the portion 22 by forming hooks 26 at the upper ends of the members 10—20 adapted to be received within circumferentially arranged holes 28 formed in connector 22.

Each member 10—20 has a substantially arcuate upper portion 30 which is outwardly bowed and a substantially vertical intermediate portion 32.

Each member 10, 14 and 18 below the vertical portion 32 thereof has an outwardly extending relatively elevated looped portion 34 to provide clearance relative to the connector 24, and each member 12, 16 and 20 below the portion 32 thereof has an outwardly extending looped clearance portion 36 projecting below and outwardly beyond the portions 34 to form feet for supporting the device upon a suitable surface.

The connector 24 consists of a pair of spaced plates 38 secured together by a central rivet or other fastening means 40. The several members 10—20 have horizontal extending end portions 42 disposed between the plates 38 and terminating in vertical pivots 44 received within the holes 46 formed in the upper plate 38 and arranged circumferentially about the rivet 40.

The edge portions of the members 38 at points in radial alignment with the holes 46 are provided with opposing recesses 48 forming locking means for the members 10—20. When the members 10—20 are extended the horizontal portions 42 thereof are received within the recesses 48, the inherent resiliency of the plates 38 serving to frictionally grip the portions 42 to retain the members 10—20 locked in expanded position.

The several members 10—20 are adapted to be folded together or collapsed towards the rear, looking at Fig. 1 and as shown at Figs. 4, 5 and 6, so that the several members are disposed substantially in parallelism with each other and in close relation. To permit of the members 10—20 located at the front being folded in substantially parallelism with the other folded members and in close relation thereto, the looped portions 34 and 36 thereof are preferably arranged at an angle to the horizontal portions 42 thereof, as indicated at 50, and the upper portions of the members 10 and 20 are likewise arranged at angles relative to the hook portions 26 thereof, as indicated at 52.

When the members 10 and 20 are folded back the angular arrangement thereof permits of the same being folded substantially in parallelism with the other members, as shown at Figs. 5 and 6.

The several members 10—20 in expanded positions thereof, as shown at Fig. 1, are arranged in planes which are substantially radial. The portions 36 provide ample support for the device upon a surface, and the substantially arcuate portions 30 conjointly provide an enlarged or extended support for a hat or the like so that the same may be supported without being unduly bulged. When the members 10—20 are expanded the horizontal lower portions 42 thereof snap into the grooves 48 and are locked in expanded or extended position. When it is desired to fold the parts, sufficient force is imposed upon the members 10—20 to cause the same to disengage the recesses 48, the members then being folded back as shown at Figs. 4, 5 and 6.

My invention provides a device which may be produced and sold at low cost, which is simple in construction, which, when expanded, provides an enlarged support for a hat and which is not readily overturned. When the device is not in use the same may be readily folded into compact form so that it may be packed in traveling bags without occupying too much space, or otherwise placed out of the way.

Having thus described my invention what I claim and desire to secure by Letters Patent is:

1. A support comprising end members, and a plurality of vertically extending members connected to said end members, said vertically extending members having upper portions conjointly forming a relatively enlarged support and certain of said members having angular lower portions extending below the lower end member to form feet for supporting the device upon a surface.

2. A support comprising end members, and a plurality of vertically extending members pivotally connected to said end members, said vertically extending members having upper portions conjointly forming a relatively enlarged support and lower portions forming feet for supporting the device upon a surface.

3. A support comprising end members, and a plurality of vertically extending wire members connected to said end members, said wire members having symmetrically spaced arcuate upper portions conjointly forming a relatively enlarged support and certain of said wire members having angular lower portions extending below the lower end member to form feet for supporting the device upon a surface.

4. A support comprising end members, and a plurality of vertically extending wire members pivotally connected to said end members, said wire members having arcuate upper portions conjointly forming a relatively enlarged support and angular lower portions providing clearance relative to the lower end member to permit of the pivotal movement of said wire members, and forming feet for supporting the device upon a surface.

5. A support comprising end members, a plurality of vertically extending members pivotally connected to said end members, said vertically extending members having upper portions conjointly forming a relatively enlarged support and lower portions forming feet for supporting the device upon a surface, and means for retaining said vertically extending members in extended position.

6. A support comprising end members, a plurality of vertically extending members pivotally connected to said end members, said vertically extending members having upper portions conjointly forming a relatively enlarged support and lower portions forming feet for supporting the device upon a surface, and means on certain of said end members adapted to frictionally engage said vertically extending members to retain the same in extended position.

7. A support comprising end members, and a plurality of vertically extending members pivotally connected at the ends thereof to said end members, and adapted to be folded together, said vertically extending members in the extended position thereof being disposed in radiating planes and having substantially arcuate upper portions conjointly forming an enlarged support and angular lower portions extending outwardly from the lower end member to permit of clearance between the parts, and certain of the angular lower portions forming feet for supporting the device upon a surface.

8. A support comprising end members, and a plurality of vertically extending members pivotally connected at the ends thereof to said end members at spaced points arranged circumferentially upon the latter, said vertically extending members in the extended position thereof being disposed in radiating planes and having substantially arcuate upper portions conjointly forming an enlarged support and angular lower portions extending outwardly from the lower end member and then inwardly relative thereto, certain of the angular lower portions forming feet for supporting the device upon a surface, and the intermediate portions of certain of said vertically extending members being arranged at an angle to the end portions thereof to permit of all of the members being folded back into compact relation to each other.

9. A support comprising end members, and a plurality of vertically extending members pivotally connected at the ends thereof to said end members, certain of said vertically extending members having intermediate portions at an angle to the end portions thereof to permit of all of said members being folded back into compact relation to each other, and all thereof having substantially arcuate upper portions conjointly forming an enlarged support and angular lower portions extending outwardly from the lower end member to permit of clearance between the parts, certain of the angular lower portions forming feet for supporting the stand upon a surface, and means on certain of said end members for frictionally and yieldably retaining said vertical extending members in extended position.

10. A support comprising end members, certain of said end members including opposing plates having recesses therebetween at spaced points about the periphery thereof, and a plurality of vertically extending members pivotally connected to said end members and having portions extending between said plates and adapted to engage said recesses to retain said vertically extending members in extended position.

11. A support comprising end members, certain of said end members including opposing plates having recesses therebetween at spaced points about the periphery thereof, and a plurality of vertically extending members pivotally connected to said end members and having portions extending between said plates and adapted to engage said recesses to retain said vertically extending members in extended position, said vertically extending members having upper portions forming an enlarged support, and lower portions forming feet for supporting the device upon a surface.

12. A support comprising an end member having holes therein arranged circumferentially thereon, a second end member including opposing plates having recesses formed therebetween at spaced points about the periphery thereof, and one plate having holes therein arranged circumferentially thereon inwardly of said recesses, a plurality of vertically extending members having end portions pivotally received within the holes of the first end member and horizontally extending portions at the opposite ends thereof extending between said plates and terminating in pivot portions received within the holes in one of said plates, said horizontal portions being adapted to engage said recesses to frictionally retain said vertically extending members in extended position.

13. A support comprising an upper end member having holes therein arranged circumferentially thereon, a lower end member including opposing plates having recesses formed therebetween at spaced points about the periphery thereof, and one plate having holes therein arranged circumferentially thereon inwardly of said recesses, a plurality of vertically extending members having end portions pivotally received within the holes of the upper end member and horizontally extending portions at the opposite ends thereof extending between said plates and terminating in pivot portions received within the holes in one of said plates to permit of said members being folded back into compact relation to each other, said horizontal portions being adapted to engage said recesses to frictionally retain said vertically extending members in extended position, and said vertically extending members having arcuate upper portions forming an enlarged support, and angular lower portions extending outwardly from said lower end member to provide clearance relative thereto, and certain of said angular lower portions forming feet for supporting the device upon a surface.

14. A support comprising a plurality of vertically extending portions having pivotal connections at the top and bottom for allowing movement thereof into collapsed and extended positions, said vertically extending portions at the upper parts thereof conjointly forming an enlarged support for a hat or the like, and at lower parts thereof forming feet for supporting the device upon a surface.

15. A support comprising a plurality of vertically extending portions having pivotal connections at the top and bottom for allowing movement thereof into collapsed and extended positions, and, in the extended position thereof, being disposed in circumferentially spaced relation to each other about a vertical axis to form a frame structure, said vertically extending portions at the upper parts thereof being outwardly bowed to form a support for a hat or the like, and at lower parts thereof forming angular feet extending downwardly below the bottom pivotal connection for supporting the device upon a surface.

In testimony whereof, I have signed my name hereto.

FAIRFIELD W. HOBAN.